(12) United States Patent
Cho et al.

(10) Patent No.: US 7,719,375 B2
(45) Date of Patent: May 18, 2010

(54) AUTOMATICALLY CALIBRATING FREQUENCY FEATURES OF A PHASE LOCKED LOOP

(75) Inventors: Seong-Hwan Cho, Daejeon (KR);
Kyung-Lok Kim, Seoul (KR);
Jung-Hyup Lee, Daegu (KR); Joon-Hee Lee, Daejeon (KR)

(73) Assignee: Korea Advanced Institute of Sciene and Technology, Daejeon (KR)

( * ) Notice: Subject to any disclaimer, the term of this patent is extended or adjusted under 35 U.S.C. 154(b) by 457 days.

(21) Appl. No.: 11/745,654

(22) Filed: May 8, 2007

(65) Prior Publication Data

US 2007/0264951 A1  Nov. 15, 2007

(30) Foreign Application Priority Data

May 11, 2006  (KR) ...................... 10-2006-0042345

(51) Int. Cl.
*H03B 1/00* (2006.01)
(52) U.S. Cl. ............................ 331/177 V; 331/117 FE; 331/167; 331/117 R; 331/16
(58) Field of Classification Search .................. 331/167, 331/117 FE, 177 V, 16, 117 R
See application file for complete search history.

(56) References Cited

U.S. PATENT DOCUMENTS 7,154,342 B2 * 12/2006 Munker et al. ................ 331/11
7,583,773 B2 *  9/2009 Su et al. ..................... 375/375

* cited by examiner

*Primary Examiner*—Arnold Kinkead
(74) *Attorney, Agent, or Firm*—Daly, Crowley, Mottord & Durkee, LLP (57) ABSTRACT

A PLL includes an open-loop automatic frequency calibration circuit. The open-loop automatic frequency calibration circuit includes a frequency detector, first and second sinks, a comparator and a bank selector. The frequency detector generates an up-signal and a down-signal responding to a frequency difference between a first phase difference signal having a phase difference from a reference oscillation signal and the second phase difference signal having a phase difference from a frequency division oscillation signal. The first and second sinks discharge the first and second capacitors respectively responding to the up-signal and the down-signal. The comparator compares voltages of the first and second capacitors. The bank selector selects a bank according to binary search, selects an optimum bank among two banks lastly searched, and outputs a bank selection signal. The voltage-controlled oscillation changes frequency features thereof in response to the bank selection signal.

10 Claims, 6 Drawing Sheets

AUTOMATICALLY CALIBRATING FREQUENCY FEATURES OF A PHASE LOCKED LOOP

CROSS-REFERENCE TO RELATED APPLICATIONS

This application claims priority under 35 USC §119 to Korean Patent Application No. 2006-42345, filed on May 11, 2006 in the Korean Intellectual Property Office (KIPO), the disclosure of which is incorporated herein in its entirety by reference.

BACKGROUND OF THE INVENTION

1. Field of the Invention

The present invention relates to a phase locked loop (PLL), and more particularly to a method of automatically calibrating frequency features of a PLL, and a PLL including an open-loop automatic frequency calibration circuit.

2. Description of the Related Art

A PLL is typically used in communication systems as a circuit for generating a locked frequency signal. A time for locking an output signal of a PLL to a target frequency is referred to as a locking time. Recently, communication systems require the PLL having a short locking time. Because a voltage-controlled oscillator in the PLL is an analog circuit, frequency features of a voltage-controlled oscillator may be changed depending on process variations during complementary metal oxide semiconductor (CMOS) fabrication. Therefore, a PLL that includes an automatic frequency calibrator (AFC) for calibrating frequency features of a voltage-controlled oscillator have been developed.

The AFC circuit may be classified into a closed-loop AFC circuit and an open-loop AFC circuit. Whereas the closed-loop AFC circuit can calibrate frequency features of a voltage-controlled oscillator more accurately, the PLL including the closed-loop AFC circuit has a slow operating speed and a long locking time in comparison with the PLL including the open-loop AFC circuit. On the contrary, the PLL including the open-loop AFC circuit has a fast operating speed and a short locking time, but the open-loop AFC circuit may inaccurately calibrate frequency features of a voltage-controlled oscillator.

Figure 1:
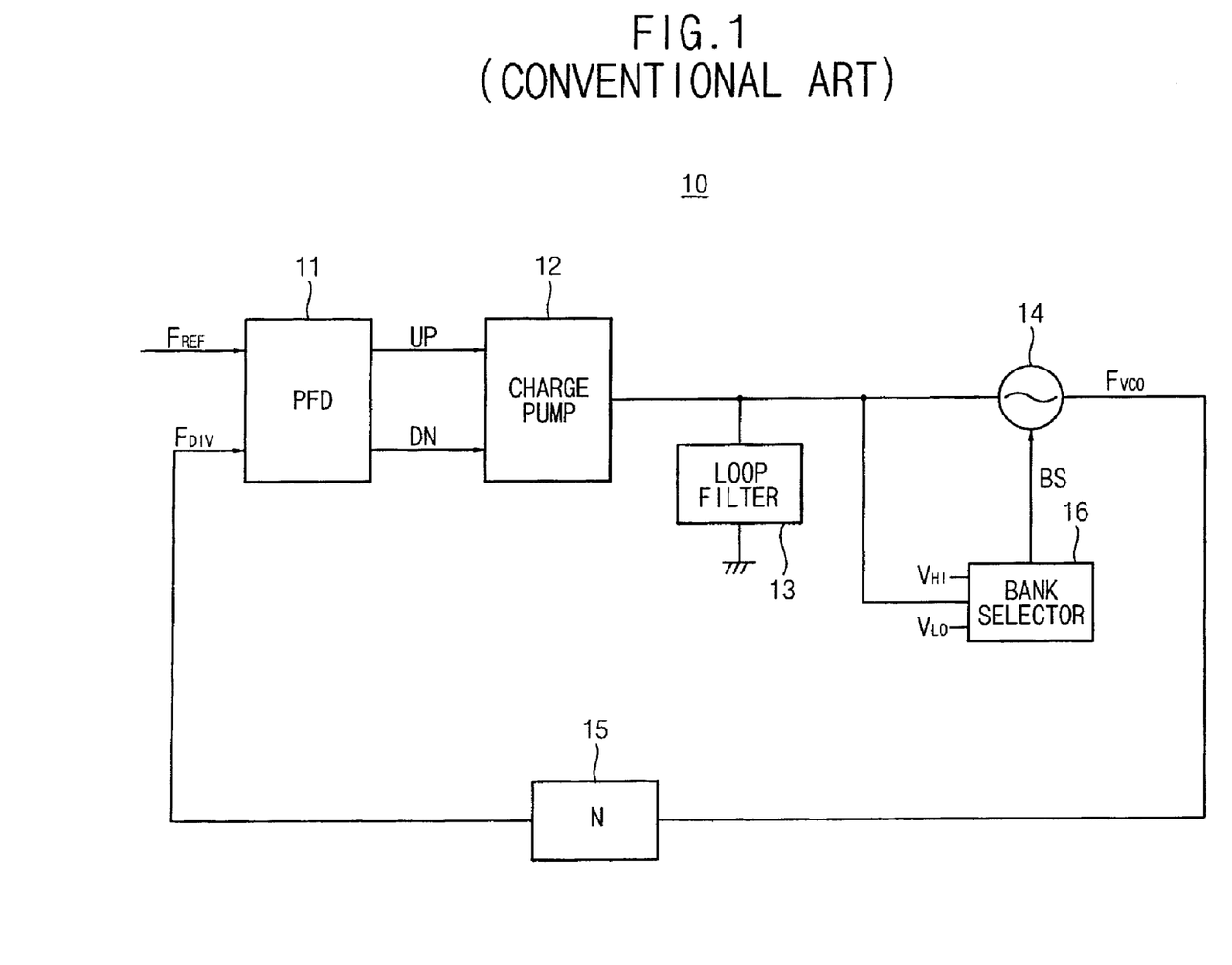
FIG. 1 is a block diagram illustrating a phase-locked loop (PLL) that calibrates frequency features of a voltage-controlled oscillator (VCO) by using a closed-loop automatic frequency calibrator (AFC) circuit.

FIG. 1 is a block diagram illustrating a PLL that calibrates frequency features of a voltage-controlled oscillator by using a closed-loop AFC circuit.

Referring to FIG. 1, the PLL includes a phase frequency detector (PFD) 11, a charge pump 12, a loop filter (LF) 13, a voltage-controlled oscillator (VCO) 14, a frequency divider 15, and a bank selector 16.

The PFD 11 generates phase signals UP and DN by comparing a frequency division oscillation signal FDIV, which is divided from an oscillation signal FVCO, with a reference signal FREF. The charge pump 12 supplies charges to capacitors of the LF 13 or absorbs charges from the capacitors responding to the phase signals UP and DN. The voltage-controlled oscillator 14 generates an oscillation signal FVCO that has a frequency corresponding to voltage VLF of the loop filter 13.

The voltage-controlled oscillator 14 may include capacitor-arrays whose frequency features are controlled by an external switching signal. The component such as the capacitor-arrays used for plural frequency features is referred to as banks. The bank is selected responding to a bank selection signal BS received from outside. A bank selector 16 generates the bank selection signal BS responding to a comparison result between reference voltages VHI and VLO and a voltage of a loop filter. The voltage of the loop filter is also inputted into the voltage-controlled oscillator 14. For example, the bank selection signal BS has 00' in value if VLF is lower than VLO. The bank selection signal BS has 01 in value if VLF is a value between VHI and VLO. The bank selection signal BS has 11 in value if VLF is higher than VHI. The voltage-controlled oscillator 14 changes frequency features thereof responding to the bank selection signal BS and generates a proper oscillation signal FVCO responding to proper voltage VLF of the loop filter.

In the closed-loop AFC circuit, a time for calibrating frequency features of a voltage-controlled loop 14 properly is equal to a time calculated by multiplying a time for settling the voltage of the loop filter at some voltage level after changing a bank by the number of bank changes until finding an optimum bank. Since a bandwidth of a PLL is not broad, a calibration takes long time.

Figure 2:
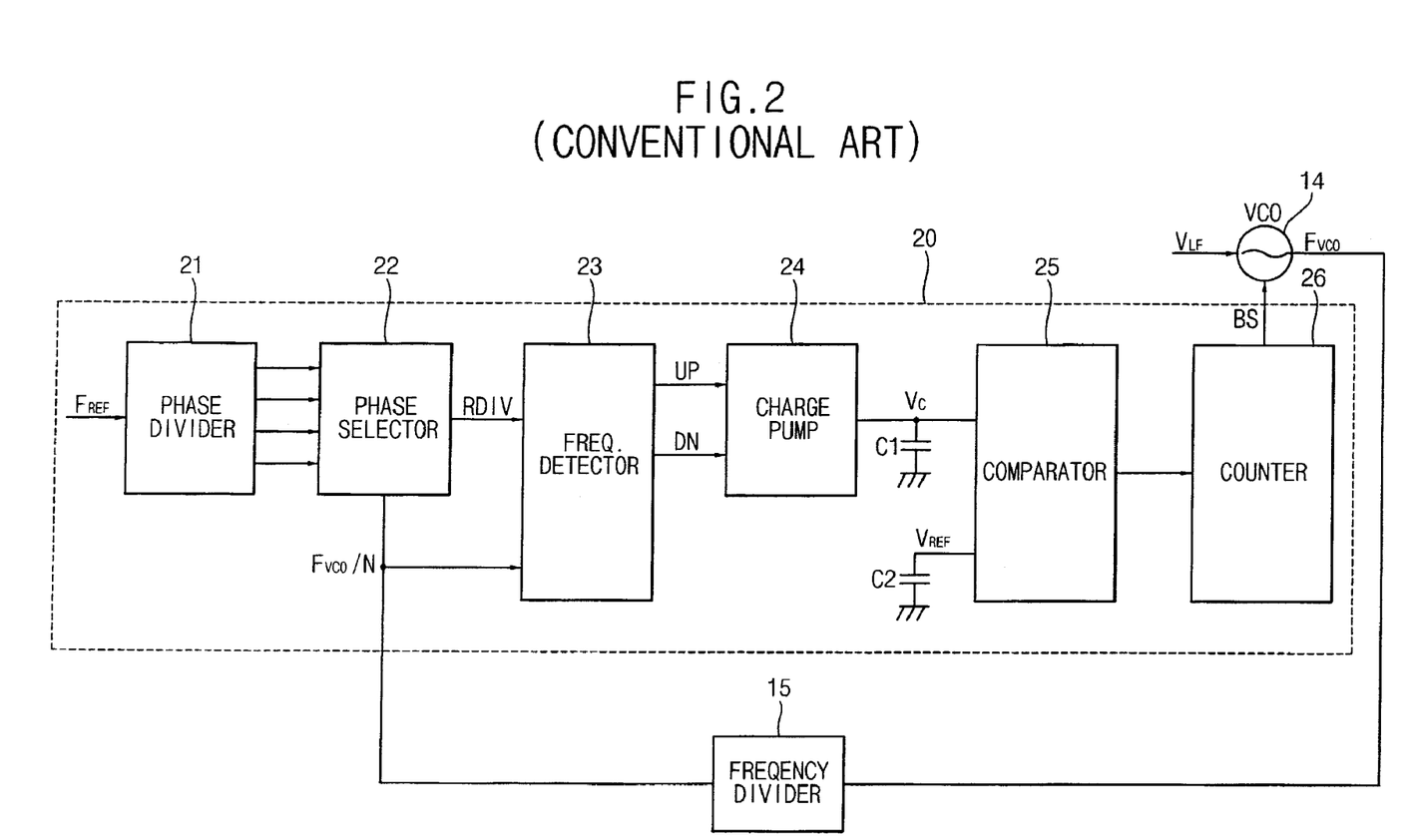
FIG. 2 is a block diagram illustrating an open-loop AFC circuit in a PLL.

FIG. 2 is a block diagram illustrating an open-loop AFC circuit in a PLL.

Referring to FIG. 2, the open-loop AFC circuit 20 includes a phase divider 21, a phase selector 22, a frequency detector 23, a charge pump 24, a comparator 25, and a counter 26. In FIG. 2, parts of a PLL such as a voltage-controlled oscillator 14 and a frequency divider 15 are also illustrated. The phase divider 21 receives reference frequency FREF, divides the reference frequency FREF and generates phase difference signals that have respective phases different from each other. The phase selector 22 receives a frequency division oscillation signal FVCO/N divided from an oscillation signal FVCO that is outputted from the voltage-controlled oscillator 14, and outputs a phase difference signal RDIV among the phase difference signals received from the phase divider 21. The phase difference signal RDIV has the closest lag-phase compared with the frequency division oscillation signal FVCO/N. The frequency detector 23 compares the selected phase difference signal RDIV with the frequency division oscillation signal FVCO/N, and generates an up-signal UP and a down-signal DN depending on the comparison result. The charge pump 24 charges and discharges a first capacitor C1 responding to the up-signal UP and the down-signal DN. Voltage of a second capacitor C2 is always maintained at reference voltage level VREF. The comparator 25 compares voltage VC of the first capacitor C1 with the reference voltage VREF of the second capacitor C2, and outputs a comparison result. The counter 26 counts the comparison result, and generates a bank selection signal BS. By using a linear algorithm, the counter 26 may select initially a bank having the lowest number, and may search banks by moving up bank-number until finding an optimum bank. Alternatively the counter 26 may select initially a bank having the highest number, and may search banks by moving down bank-number until finding an optimum bank.

The open-loop AFC circuit of FIG. 2 does not receive voltage VLF of the loop filter whereas the closed-loop AFC circuit of FIG. 1 receives voltage VLF of the loop filter. Therefore, the open-loop AFC circuit can calibrate frequency features of the voltage-controlled oscillator 14 more quickly than the closed-loop AFC circuit regardless of a bandwidth of the loop filter. But, finding an optimum bank by using a linear algorithm takes long time, and may select a non-optimum bank near an optimum bank according as the number of banks is increased. Accordingly a new algorithm for solving the above problems is needed.

A phase difference between the phase difference signal RDIV and the frequency division oscillation signal FVCO/N can be exaggerated compared with a real phase difference since there is a signal skew difference between the phase difference signal RDIV that goes through the phase selector 22 and the frequency division oscillation signal FVCO/N. That is, a rising time difference or a falling time difference between the phase difference signal RDIV that goes through the phase selector 22 and the frequency division oscillation signal FVCO/N can make errors. Therefore, a wrong bank selection signal may be selected due to the errors.

When implementing the charge pump of the open-loop AFC circuit of FIG. 2, it is difficult to match up-currents for charging capacitors with down-currents for discharging the capacitors. Therefore, a wrong bank may be selected as an optimum bank if the up-currents are mismatched with the down-currents.

Two charge pumps can be implemented in the open-loop AFC circuit of FIG. 2. The first charge pump charges and discharges a first capacitor C1 related to a voltage VC responding to the up-signal UP and the down-signal DN. The second charge pump charges and discharges a second capacitor C2 related to a voltage VREF to compensate the mismatch between the up currents and the down currents. However the compensation is imperfect. Therefore, a wrong bank may also be selected as an optimum bank in this implementation.

SUMMARY OF THE INVENTION

Accordingly, the present invention is provided to substantially obviate one or more problems due to limitations and disadvantages of the related art.

Some embodiments of the present invention provide an automatic frequency calibration method that makes small errors and finds an optimum bank quickly in a phase locked loop (PLL).

Some embodiments of the present invention provide a phase locked loop (PLL) including an automatic frequency calibration circuit that makes small errors and finds an optimum bank quickly.

In some example embodiments of the present invention, a method of automatically calibrating frequency features of a phase locked loop that has a plurality of banks by using a phase difference between a frequency division oscillation signal and a reference oscillation signal, includes finding an optimum bank among the plurality of banks by performing binary search including first through n-th binary searches, and selecting the optimum bank between a first bank selected by the (n−1)-th binary search and a second bank selected by the n-th binary search.

Finding the optimum bank among the plurality of banks by performing binary search may includes charging a first capacitor and a second capacitor with a reference voltage, generating an up-signal and a down-signal responding to a phase s difference between the frequency division oscillation signal and the reference oscillation signal, discharging the first capacitor and the second capacitor responding to the up-signal and the down-signal, comparing a voltage of the first capacitor with a voltage of the second capacitor after discharging the first and second capacitors, and selecting a bank based on the comparison result according to a regulation of binary search.

Selecting the optimum bank between the first bank and the second bank may include charging a first capacitor and a second capacitor with reference voltage level, generating a first up-signal and a first down-signal responding to a phase difference between the reference oscillation signal and an output oscillation signal corresponding to the first bank, discharging the first capacitor and the second capacitor responding to the first up-signal and the first down-signal, respectively, comparing a voltage (Vup1) of the first capacitor with a voltage (Vdn1) of the second capacitor after discharging the first and second capacitors, generating a second up-signal and a second down-signal responding to a phase difference between the reference oscillation signal and the output oscillation signal corresponding the second bank, discharging the first capacitor and the second capacitor responding to the second up-signal and the second down-signal, comparing a voltage (Vup2) of the first capacitor with a voltage (Vdn2) of the second capacitor after discharging capacitors, and deciding an optimum bank based on the comparison result corresponding to the first bank and the comparison result corresponding to the second bank.

Deciding the optimum bank may include deciding the second bank as the optimum bank when Vup1 is higher than Vdn1 and Vup2 is higher than Vdn2, deciding the first bank as the optimum bank when Vup1 is higher than Vdn1 and Vup2 is lower than Vdn2, deciding the first bank as the optimum bank when Vup1 is lower than Vdn1 and Vup2 is higher than Vdn2, and deciding the second bank as the optimum bank when Vup1 is lower than Vdn1 and Vup2 is lower than Vdn2.

Generating the up-signal and the down-signal may include generating a first phase difference signal that has a first phase difference with respect to the frequency division oscillation signal, generating a second phase difference signal that has a second phase difference with respect to the reference oscillation signal, the second phase difference signal having a lagged-phase compared with the first phase difference signal, generating an up-signal in a section from a rising edge of the first phase difference signal to a rising edge of the second phase difference signal, and generating a down-signal in a section from a falling edge of the first phase difference signal to a falling edge of the second phase difference signal.

Generating the first phase difference signal may include selecting an oscillation phase difference signal among a plurality of oscillation phase difference signals such that the oscillation phase difference signal has a phase rightly after a phase of a first signal received from outside, the plurality of oscillation phase difference signals being generated from the frequency division oscillation signal and having phases different from each other. In addition generating the second phase difference signal may include selecting a reference phase difference signal among a plurality of reference phase difference signals such that the reference phase difference signal has a phase rightly after a phase of the selected oscillation phase difference signal, the plurality of reference phase difference signals being generated from the reference oscillation signal and having phases different from each other.

In some example embodiments of the present invention, a phase locked loop includes a voltage-controlled oscillator, a frequency divider, and an open-loop automatic frequency calibration circuit.

The voltage-controlled oscillator is configured to generate an output oscillation signal and configured to change frequency features thereof responding to a bank selection signal. The frequency divider is configured to generate a frequency division oscillation signal by dividing the output oscillation signal.

The open-loop automatic frequency calibration circuit includes a frequency detector, a first sink, a second sink, a comparator, and a bank selector. The frequency detector is configured to generate an up-signal and a down-signal in response to a frequency difference between a first phase difference signal that has a phase difference with respect to a reference oscillation signal and a second phase difference signal that has a phase difference with respect to the frequency division oscillation signal outputted from the frequency divider. The first sink is configured to discharge a first capacitor in response to the up-signal. The second sink is configured to discharge a second capacitor in response to the down-signal. The comparator is configured to compare a voltage of the first capacitor with a voltage of the second capacitor. The bank selector is configured to generate the bank selection signal for selecting a bank based on the comparison result among a plurality of banks corresponding to a plurality of frequency features of the voltage-controlled oscillator by performing binary search including first through n-th binary searches. In addition, the bank selector is configured to select an optimum bank between a first bank selected the (n−1)-th binary search and a second bank selected by the n-th binary search to output the bank selection signal corresponding to the optimum bank.

The open-loop automatic frequency calibration circuit may further include a first phase selector and a second phase selector. The first phase selector may be configured to select an oscillation phase difference signal among a plurality of oscillation phase difference signals such that the oscillation phase difference signal has a phase rightly after a phase of a first signal received from outside, in which the plurality of oscillation phase difference signals are generated from the frequency division oscillation signal and have phases different from each other. The second phase selector may be configured to select a reference phase difference signal among a plurality of reference phase difference signals such that the reference phase difference signal has a phase rightly after a phase of the selected oscillation phase difference signal, in which the plurality of reference phase difference signals are generated from a reference oscillation signal and have phases different from each other.

The first and second phase selectors, the first and second capacitors, and the first and second sinks may have substantially same electrical features, respectively.

The bank selector may be configured to compare a voltage (Vup1) of the first capacitor with a voltage (Vdn1) of the second capacitor, Vup1 and Vdn1 corresponding to a frequency feature of the first bank, configured to compare a voltage (Vup2) of the first capacitor with a voltage (Vdn2) of the second capacitor, Vup2 and Vdn2 corresponding to a frequency feature of the second bank, and configured to decide an optimum bank responding to the comparison corresponding to the first bank and the comparison result corresponding to the second bank to output the bank selection signal.

The bank selector may be configured to decide the second bank as the optimum bank when Vup1 is higher than Vdn1 and Vup2 is higher than Vdn2, configured to decide the first bank as the optimum bank when Vup1 is higher than Vdn1 and Vup2 is lower than Vdn2, configured to decide the first bank as the optimum bank when Vup1 is lower than Vdn1 and Vup2 is higher than Vdn2, and configured to decide the second bank as the optimum bank when Vup1 is lower than Vdn1 and Vup2 is lower than Vdn2, to output the bank selection signal for selecting the optimum bank between the first bank and the second bank.

DESCRIPTION OF THE EMBODIMENTS

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
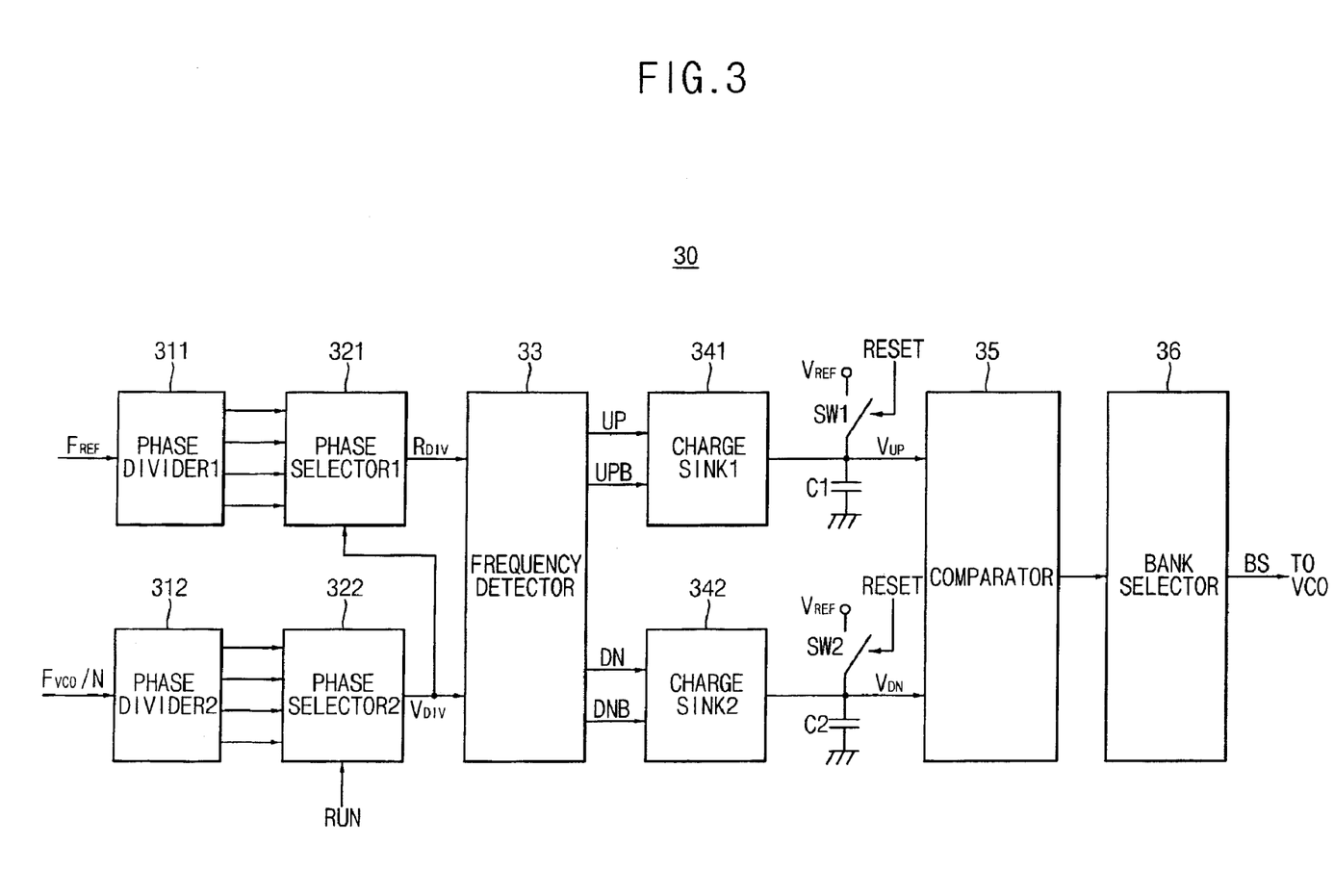
FIG. 3 is a block diagram illustrating an open-loop AFC circuit according to an example embodiment of the present invention.

FIG. 3 is a block diagram illustrating an open-loop AFC circuit according to an example embodiment of the present invention.

Referring to FIG. 3, the open-loop AFC circuit 30 includes a first phase divider 311, a second phase divider 312, a first phase selector 321, a second phase selector 322, a frequency detector 33, a first charge sink 341, a second charge sink 342, a 1o first capacitor C1, a second capacitor C2, a first reset switch SW1, a second reset switch SW2, a comparator 35, and a bank selector 36.

The first phase divider 311 generates reference phase difference signals having a phase difference based on a reference signal FREF. The second phase divider 312 generates oscillation phase difference signals having a phase difference based on a frequency division oscillation signal FVCO/N divided from an output oscillation signal FVCO. The first phase divider 311 and the second phase divider 312 may have substantially the same structure.

The second phase selector 322 operates responding to a signal RUN, selects an oscillation phase difference signal which is a next signal rightly after the signal RUN among the oscillation phase difference signals, and outputs the selected oscillation phase difference signal VDIV. The signal RUN may be generated by dividing the reference signal FREF by 2. The first phase selector 321 receives the selected oscillation phase difference signal VDIV, selects a reference phase difference signal which is a next signal rightly after the oscillation phase difference signal among the reference phase difference signals, and outputs the selected reference phase difference signal RDIV.

The frequency detector 33 receives the signal RDIV and the signal VDIV, detects what signal has a higher frequency by estimating phases and edges of the signal RDIV and the signal VDIV, and generates an up-signal UP or a down-signal DN corresponding to the comparison result of the signals RDIV and VDIV. For example, an up-signal UP is generated in a section from a rising edge of the signal VDIV to a rising edge of the signal RDIV and a down-signal DN is generated in a section from a falling edge of the signal VDIV to a falling edge of the signal RDIV.

If frequency of the signal VDIV is higher than frequency of the signal RDIV, a high section of a down-signal DN is formed longer than a high section of an up-signal UP and the frequency of the signal VDIV becomes lower. On the contrary, if the frequency of the signal VDIV is lower than the frequency of the signal RDIV, the high section of the up-signal UP is formed longer than the high section of the down-signal DN and the frequency of the signal VDIV become higher.

The first charge sink 341 discharges the first capacitor C1 in proportion to a time of the high section of an up-signal UP. The voltage Vup of the first capacitor C1 is decreased with a substantially constant slope. The second charge sink 342 discharges the second capacitor C2 in proportion to a time of the high section of a down-signal DN. Voltage Vdn of the second capacitor C2 is decreased with a substantially constant slope. The first capacitor C1 and the second capacitor C2 are recharged at reference voltage level VREF responding to a signal RESET every time after being compared by the comparator 35. The signal RESET may be a reversed signal of the signal RUN. In other words, whereas the AFC circuit of FIG. 2 compares voltage VC of the first capacitor C1 with reference voltage VREF after charging or discharging capacitors, the AFC circuit of FIG. 3 compares the voltage Vup of the first capacitor C1 with the voltage Vdn of the second capacitor C2 after discharging capacitors respectively responding to an up-signal and a down-signal.

The comparator 35 compares the voltage Vup of the first capacitor C1 with the voltage Vdn of the second capacitor C2 after discharging capacitors, and outputs the comparison result. The comparison result is inputted into the bank selector 36.

By using binary search, the bank selector 36 may generate a bank selection signal by searching banks closed to an optimum bank repetitively. The bank selector 36 selects an optimum bank between a last bank and a bank rightly before the last bank, and generates a bank selection signal.

The AFC circuit of FIG. 3 has a pseudo differential topology. The AFC circuit has two phase dividers 311 and 312 which are formed symmetrically and two phase 10 selectors 321 and 322 which are formed symmetrically. Therefore, a phase difference between a signal RDIV and a signal VDIV, which are inputted into the frequency detector 33, becomes substantially the same as a phase difference between an actual reference signal FREF and a frequency division oscillation signal FVCO/N. Likewise, the effect of the pseudo differential topology is improved by two charge sinks 341 and 342 which are formed symmetrically and two capacitors C1 and C2 which are formed symmetrically. Although voltage level Vup and Vdn which are inputted into the comparator 35 are influenced by abnormal features of switching, noises, and the like, the influences can be cancelled due to the symmetric structure. The errors generated by discordance between charging and discharging can be reduced since the AFC circuit uses two symmetrical capacitors C1 and C2 and two symmetrical charge sinks 341 and 342.

Figure 4:
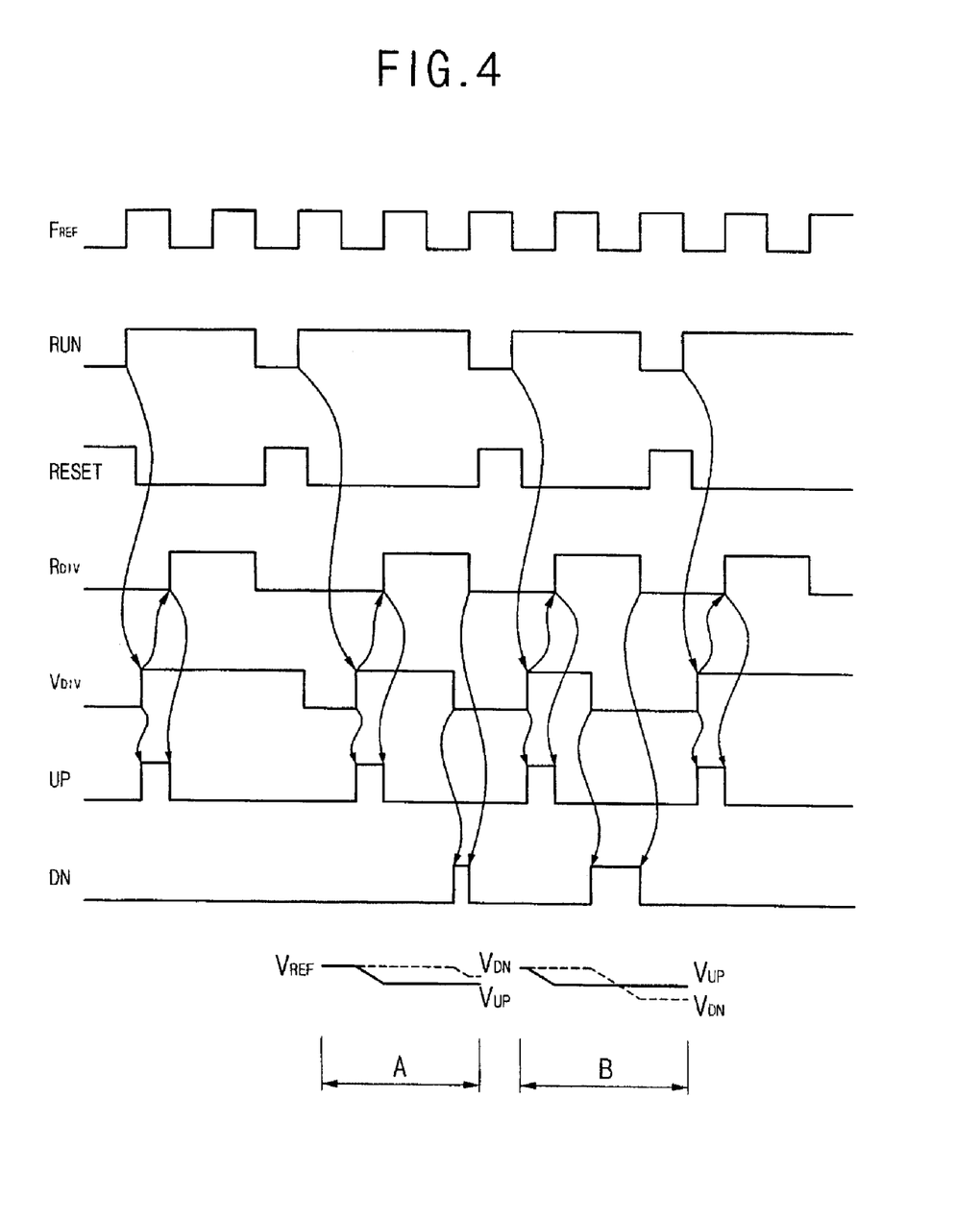
FIG. 4 is a timing diagram illustrating an operation of an AFC circuit according to an example embodiment of the present invention.

FIG. 4 is a timing diagram illustrating an operation of an AFC circuit according to an example embodiment of the present invention.

In FIG. 4, a reference signal FREF, a signal RUN, a signal RESET, a reference phase difference signal RDIV, an oscillation phase difference signal VDIV, an up-signal UP, a down-signal DN, an up capacitor voltage Vup, and a down capacitor voltage Vdn are shown.

The signal RUN is generated based on a reference signal FREF. The signal RUN may rise at every first pulse of the reference signal FREF and may fall at every third pulse of the reference signal FREF. The signal RESET may be substantially a signal a little delayed from an inverted signal of the signal RUN. Responding to the signal RUN, an oscillation phase difference signal VDIV is selected among oscillation phase difference signals based on the frequency division oscillation signal FVCO/N. Responding to this selected oscillation phase difference signal VDIV, a reference phase difference signal RDIV is selected among phase difference signals based on the reference signal FREF. Therefore, the selected reference phase difference signal RDIV always has a lagged-phase compared with the selected oscillation phase difference signal VDIV.

In a section 'A', a frequency of an oscillation phase difference signal VDIV is lower than a frequency of a reference phase difference signal RDIV. In section 'B', the frequency of the oscillation phase difference signal VDIV is higher than the frequency of the reference phase difference signal RDIV. These sections 'A' and 'B' may be consecutive sections as illustrated in FIG. 4, or may not be consecutive sections.

In the section 'A', an up-signal UP is generated from a rising edge of an oscillation phase difference signal VDIV to a rising edge of a reference phase difference signal RDIV and a down-signal DN is generated from a falling edge of an oscillation phase difference signal VDIV to a falling edge of a reference phase difference signal. A high section of an up-signal UP is longer than a high section of a down-signal DN. Therefore, voltage Vup of an up capacitor is lower than voltage Vdn of a down capacitor in the section 'A'.

In the section 'B', an up-signal UP is generated from a rising edge of an oscillation phase difference signal VDIV to a rising edge of a reference phase difference signal RDIV and a down-signal DN is generated from a falling edge of an oscillation phase difference signal VDIV to a falling edge of a reference phase difference signal RDIV. A high section of an up-signal UP is shorter than a high section of a down-signal DN. Therefore, voltage Vdn of a down capacitor is lower than voltage Vup of an up capacitor in the section 'B'.

A comparator 35 decide which frequency is higher by comparing the voltage Vup of the up capacitor with the voltage Vdn of the down capacitor.

Referring back to FIG. 3, the bank selector 36 searches an optimum bank by using binary search. The middle bank among a plurality of banks may be set up as an initial bank to output a bank selection signal BS.

The frequency of the oscillation signal and the frequency of the oscillation phase difference signal VDIV are changed responding to the bank selection signal BS. The comparator 35 receives an oscillation phase difference signal VDIV having a changed frequency and outputs a comparison result. The bank selector 36 selects a bank which is on the middle of up-part or on the middle of down-part, and outputs a bank selection signal BS responding to the comparison result.

The frequency of an oscillation signal is changed again responding to the changed bank selection signal. The comparator 35 compares the frequency of the reference phase difference signal with the frequency of the oscillation phase difference signal and outputs a comparison result. The bank selector 36 selects a bank which is on the middle of up-part or on the middle of down-part, and outputs a bank selection signal BS responding to the comparison result.

For example, if a bank of number 5 is an optimum bank among 17 banks having number 0 through number 16, by using binary search, a bank of number 8 is selected as an initial bank, a bank of number 4 is selected next, a bank of number 6 is selected next, and a bank of number 5 is selected finally. Whereas a linear search algorithm should search 16 times in the worst case for finding an optimum bank, the binary search algorithm can find an optimum bank by searching 4 times.

If an optimum bank can be found by using n times binary search, decision on which bank is an optimum bank between a bank selected by (n−1)-th binary search and a bank selected by n-th binary search should be performed.

FIGS. 5A through 5D are diagrams illustrating an algorithm for finding an optimum bank in an AFC circuit according to an example embodiment of the present invention.

Referring FIGS. 5A through 5D with reference to FIG. 3, if a difference between numbers of changed banks becomes 1, the AFC circuit doesn't reset the first capacitor C1 and the second capacitor C2, and generates a up-signal UP and a down-signal DN again while keeping the voltages Vup and Vdn. Then, the AFC circuit compares the voltages Vup and the voltages Vdn after the levels of the voltages Vup and the Vdn are lowered again responding to the up-signal UP and the down-signal DN.

If an optimum bank can be found by performing a binary search using n times, a comparison between a bank selected by the n-th binary search and a bank selected by the (n−1)-th binary search is performed. Hereinafter, the bank selected by the (n−1)-th binary search is referred to as a first bank and the bank selected by the n-th binary search is referred to as a second bank. In addition two comparisons of the comparator respectively corresponding to the (n−1)-th and n-th binary searches are referred to as a first comparison and a second comparison.

There are four patterns of the Vup and the Vdn as shown in FIG. 5A through 5D when the (n−1)-th and n-th binary searches are performed.

Figure 5A:
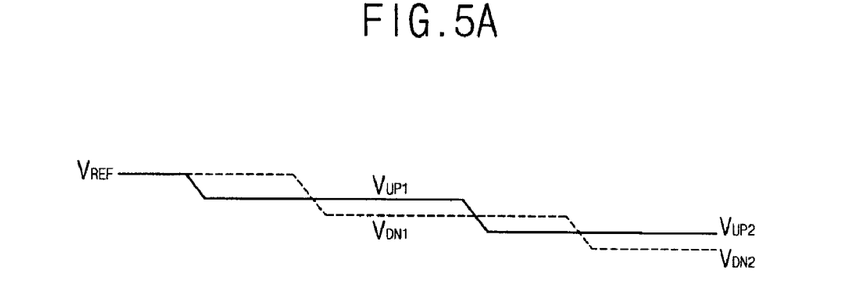
FIGS. 5A through 5D are diagrams illustrating an algorithm for finding an optimum bank in an AFC circuit according to an example embodiment of the present invention.

FIG. 5A shows the first pattern, in which the voltage Vup1 of the up capacitor is higher than the voltage Vdn1 of the down capacitor when the comparator performs the first comparison and the voltage Vup2 of the up capacitor is higher than the voltage Vdn2 of the down capacitor when the comparator performs the second comparison. In this case, the comparator 35 decides that the second bank is more close to an optimum bank than the first bank.

Figure 5B:
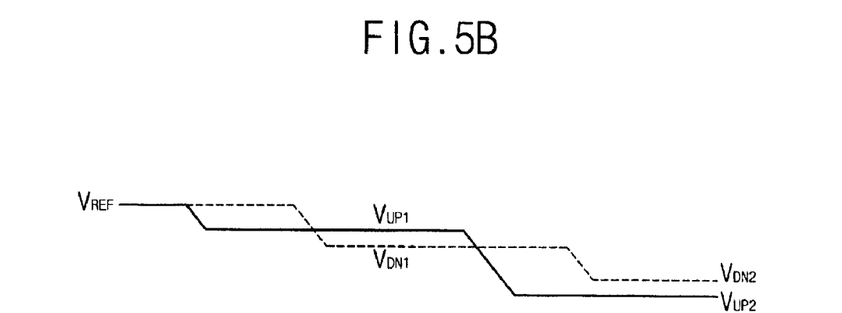

FIG. 5B shows the second pattern, in which the voltage Vup1 of the up capacitor is higher than the voltage Vdn1 of the down capacitor when the comparator performs the first comparison, and the voltage Vup2 of the up capacitor is lower than the voltage Vdn2 of the down capacitor when the comparator performs the second comparison. In this case, the comparator 35 decides that the first bank is more close to an optimum bank than the second bank.

Figure 5C:
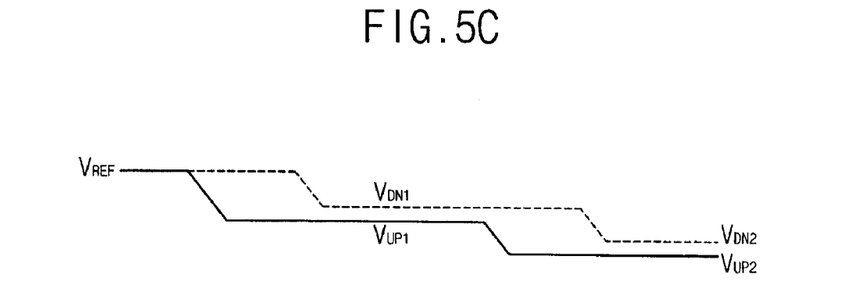

FIG. 5C shows the third pattern, in which the voltage Vup1 of the up capacitor is lower than the voltage Vdn1 of the down capacitor when the comparator performs the first comparison and the voltage Vup2 of the up capacitor is lower than the voltage Vdn2 of the down capacitor when the comparator performs the second comparison. In this case, the comparator 35 decides that the second bank is more close to an optimum bank than the first bank.

Figure 5D:
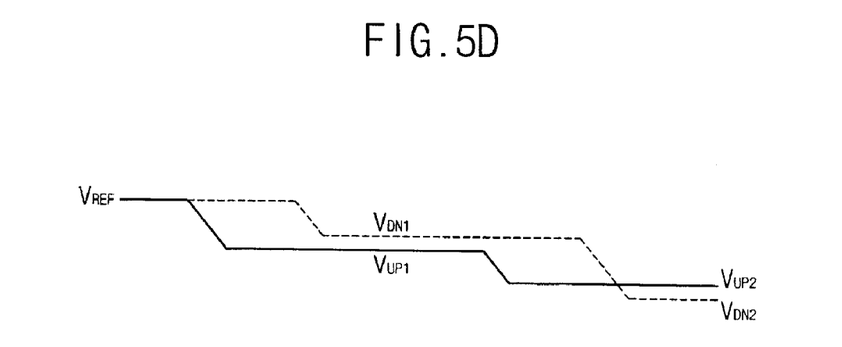

FIG. 5D shows the fourth pattern, in which the voltage Vup1 of the up capacitor is lower than the voltage Vdn1 of the down capacitor when the comparator performs the first comparison and the voltage Vup2 of the up capacitor is higher than the voltage Vdn2 of the down capacitor when the comparator performs the second comparison. In this case, the comparator 35 decides that the first bank is more close to an optimum bank than the second bank.

By using binary search as shown in FIG. 5, an optimum bank can be selected between the first bank and the second bank, that is, the two banks sequentially selected by the (n−1)-th and n-th binary searches.

Figure 6:
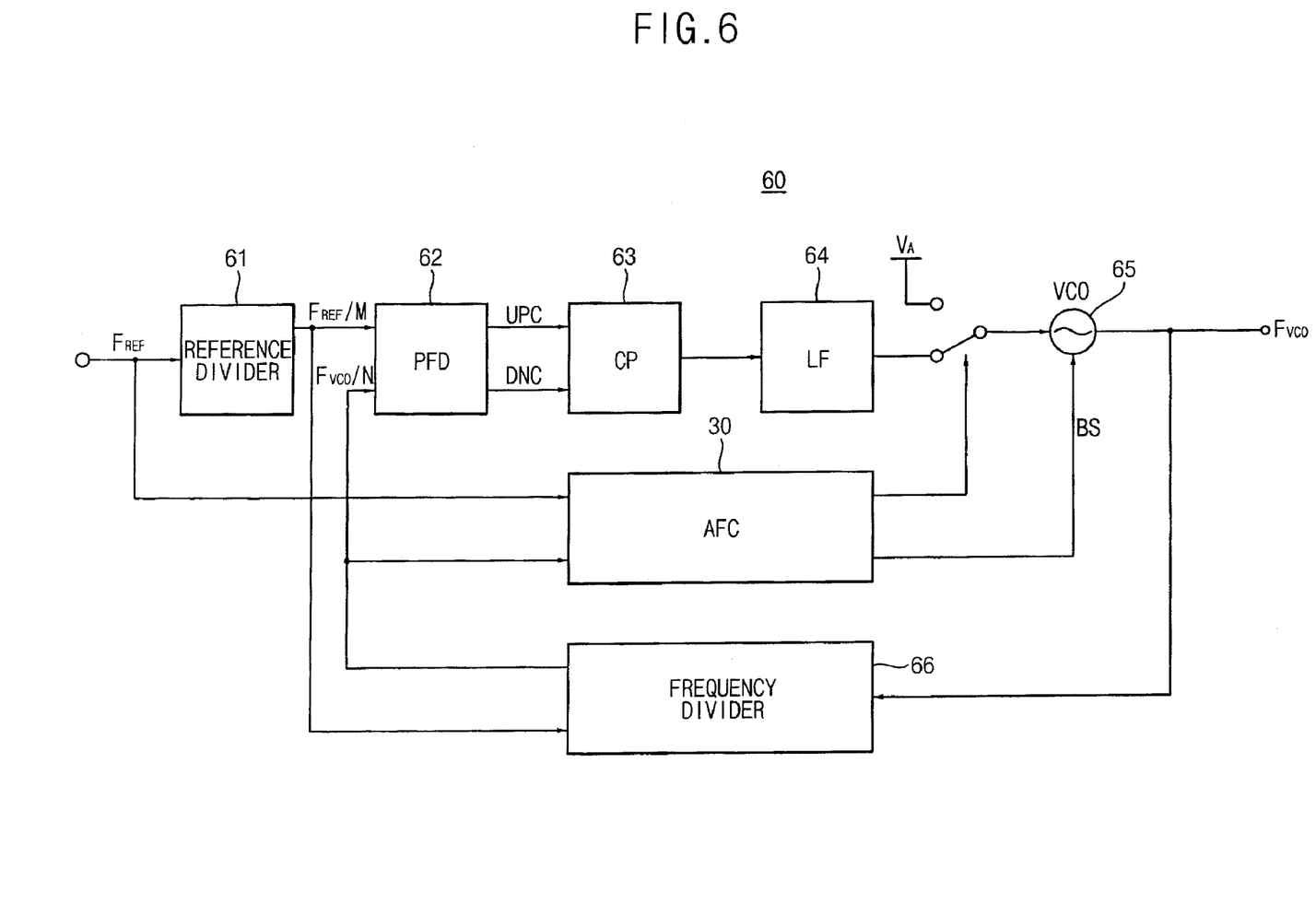
FIG. 6 is a block diagram illustrating a PLL that includes an open-loop AFC circuit according to an example embodiment of the present invention.

FIG. 6 is a block diagram illustrating a PLL that includes an open-loop AFC circuit according to an example embodiment of the present invention.

Referring to FIG. 6, the PLL 60 includes a reference divider 61, a phase/frequency detector 62, a charge pump 63, a loop filter 64, a voltage-controlled oscillator 65, a frequency divider 66, and an open loop AFC circuit 30.

The reference divider 61 generates a reference division signal FREF/M divided from a reference oscillation signal FREF by a reference division ratio M. The oscillation divider 66 generates a frequency division oscillation signal FVCO/N divided from a output oscillation signal FVCO by an oscillation division ratio N. The oscillation divider 66 divides the output oscillation signal FVCO by an integer ratio if the PLL 60 is integer-N division type. The oscillation divider 66 divides the output oscillation signal FVCO by a real number ratio if the PLL 60 is fractional-N division type.

The phase/frequency detector 62 receives the reference division signal FREF/M and the oscillation division signal FVCO/N, decides which of the two signals FREF/M and FVCO/N has a leading-phase, and generates a charge-up signal UPC or a charge-down signal DNC.

The charge pump 63 supplies charges to the loop filter 64, or absorbs charges from the loop filter 64 responding to the charge-up signal UPC or the charge-down signal DNC. A voltage VLF outputted from the loop filter 64 is inputted into the voltage-controlled oscillator 65. The voltage-controlled oscillator 65 generates an output oscillation signal FVCO responding to the voltage VLF of the loop filter.

The automatic frequency calibration circuit 30 receives the frequency division oscillation signal FVCO/N and the reference oscillation signal FREF, generates a bank selection signal BS for calibrating frequency features of the voltage-controlled oscillator 65, and outputs the bank selection signal BS to the voltage-controlled oscillator 65. Descriptions of the configuration and the operation of the automatic frequency calibration circuit 30 are the same as the above descriptions with reference to FIGS. 3, 4, and 5, and thus will be omitted.

While the automatic frequency calibration circuit 30 is calibrating banks, a direct current voltage VA is supplied to the voltage-controlled oscillator 65. When an optimum bank is selected and the PLL is ready for operating normally, the automatic frequency calibration circuit 30 is disabled and the voltage-controlled oscillator 65 receives voltage VLF from the loop filter. The automatic frequency calibration circuit 30 may control to which of the direct current voltage VA and the output of the loop filter 64 the voltage-controlled oscillator 65 is connected.

In accordance with example embodiments of the present invention, since an automatic frequency calibration circuit of a PLL has symmetric structure, errors due to mismatching between an up current and a down current can be reduced.

In accordance with example embodiments of the present invention, an optimum bank can be selected fast by using the automatic frequency calibration circuit and frequency features of a PLL can be calibrated fast and accurately. While the example embodiments of the present invention and their advantages have been described in detail, it should be understood that various changes, substitutions and alterations may be made herein without departing from the scope of the invention.

What is claimed is:

1. A method of automatically calibrating frequency features of a phase locked loop that has a plurality of banks by using a phase difference between a frequency division oscillation signal and a reference oscillation signal, the method comprising:
    finding an optimum bank among the plurality of banks by performing binary search including first through n-th binary searches; and
    selecting the optimum bank between a first bank selected by the (n−1)-th binary search and a second bank selected by the n-th binary search,
    wherein finding the optimum bank among the plurality of banks by performing binary search includes:
        charging a first capacitor and a second capacitor with a reference voltage;
        generating an up-signal and a down-signal responding to a phase difference between the frequency division oscillation signal and the reference oscillation signal;
        discharging the first capacitor and the second capacitor responding to the up-signal and the down-signal;
        comparing a voltage of the first capacitor with a voltage of the second capacitor after discharging the first and second capacitors; and
        selecting a bank based on the comparison result according to a regulation of binary search.

2. The method of claim 1, wherein selecting the optimum bank between the first bank and the second bank includes:
    charging the first capacitor and the second capacitor with reference voltage level;
    generating a first up-signal and a first down-signal responding to a phase difference between the reference oscillation signal and an output oscillation signal corresponding to the first bank;
    discharging the first capacitor and the second capacitor responding to the first up-signal and the first down-signal, respectively;
    comparing a voltage (Vup1) of the first capacitor with a voltage (Vdn1) of the second capacitor after discharging the first and second capacitors;
    generating a second up-signal and a second down-signal responding to a phase difference between the reference oscillation signal and the output oscillation signal corresponding the second bank;
    discharging the first capacitor and the second capacitor responding to the second up-signal and the second down-signal;
    comparing a voltage (Vup2) of the first capacitor with a voltage (Vdn2) of the second capacitor after discharging capacitors; and
    deciding the optimum bank based on the comparison result corresponding to the first bank and the comparison result corresponding to the second bank.

3. The method of claim 2, wherein deciding the optimum bank includes:
    deciding the second bank as the optimum bank when Vup1 is higher than Vdn1 and Vup2 is higher than Vdn2;
    deciding the first bank as the optimum bank when Vup1 is higher than Vdn1 and Vup2 is lower than Vdn2;
    deciding the first bank as the optimum bank when Vup1 is lower than Vdn1 and Vup2 is higher than Vdn2; and
    deciding the second bank as the optimum bank when Vup1 is lower than Vdn1 and Vup2 is lower than Vdn2.

4. The method of claim 1, wherein generating the up-signal and the down-signal includes:
    generating a first phase difference signal that has a first phase difference with respect to the frequency division oscillation signal;
    generating a second phase difference signal that has a second phase difference with respect to the reference oscillation signal, the second phase difference signal having a lagged-phase compared with the first phase difference signal;
    generating an up-signal in a section from a rising edge of the first phase difference signal to a rising edge of the second phase difference signal; and
    generating a down-signal in a section from a falling edge of the first phase difference signal to a falling edge of the second phase difference signal.

5. The method of claim 4, wherein generating the first phase difference signal includes selecting an oscillation phase difference signal among a plurality of oscillation phase difference signals such that the oscillation phase difference signal has a phase rightly after a phase of a first signal received from outside, the plurality of oscillation phase difference signals being generated from the frequency division oscillation signal and having phases different from each other, and
    wherein generating the second phase difference signal includes selecting a reference phase difference signal among a plurality of reference phase difference signals such that the reference phase difference signal has a phase rightly after a phase of the selected oscillation phase difference signal, the plurality of reference phase difference signals being generated from the reference oscillation signal and having phases different from each other.

6. A phase locked loop comprising:
a voltage-controlled oscillator configured to generate an output oscillation signal and configured to change frequency features thereof responding to a bank selection signal;
a frequency divider configured to generate a frequency division oscillation signal by dividing the output oscillation signal; and
an open-loop automatic frequency calibration circuit comprising:
  a frequency detector configured to generate an up-signal and a down-signal in response to a frequency difference between a first phase difference signal that has a phase difference with respect to a reference oscillation signal and a second phase difference signal that has a phase difference with respect to the frequency division oscillation signal outputted from the frequency divider;
  a first sink configured to discharge a first capacitor in response to the up-signal;
  a second sink configured to discharge a second capacitor in response to the down-signal;
  a comparator configured to compare a voltage of the first capacitor with a voltage of the second capacitor; and
  a bank selector configured to generate the bank selection signal for selecting a bank based on the comparison result among a plurality of banks corresponding to a plurality of frequency features of the voltage-controlled oscillator by performing binary search including first through n-th binary searches, and configured to select an optimum bank between a first bank selected the (n−1)-th binary search and a second bank selected by the n-th binary search to output the bank selection signal corresponding to the optimum bank.

7. The phase locked loop of claim 6, wherein the open-loop automatic frequency calibration circuit further comprises:
a first phase selector configured to select an oscillation phase difference signal among a plurality of oscillation phase difference signals such that the oscillation phase difference signal has a phase rightly after a phase of a first signal received from outside, the plurality of oscillation phase difference signals being generated from the frequency division oscillation signal and having phases different from each other; and
a second phase selector configured to select a reference phase difference signal among a plurality of reference phase difference signals such that the reference phase difference signal has a phase rightly after a phase of the selected oscillation phase difference signal, the plurality of reference phase difference signals being generated from a reference oscillation signal and having phases different from each other.

8. The phase locked loop of claim 7, wherein the first and second phase selectors, the first and second capacitors, and the first and second sinks have substantially same electrical features, respectively.

9. The phase locked loop of claim 6, wherein the bank selector is configured to compare a voltage ($V_{up1}$) of the first capacitor with a voltage ($V_{dn1}$) of the second capacitor, $V_{up1}$ and $V_{dn1}$ corresponding to a frequency feature of the first bank, configured to compare a voltage ($V_{up2}$) of the first capacitor with a voltage ($V_{dn2}$) of the second capacitor, $V_{up2}$ and $V_{dn2}$ corresponding to a frequency feature of the second bank, and configured to decide an optimum bank responding to the comparison corresponding to the first bank and the comparison result corresponding to the second bank to output the bank selection signal.

10. The phase locked loop of claim 9, wherein the bank selector is configured to decide the second bank as the optimum bank when $V_{up1}$ is higher than $V_{dn1}$ and $V_{up2}$ is higher than $V_{dn2}$, configured to decide the first bank as the optimum bank when $V_{up1}$ is higher than $V_{dn1}$ and $V_{up2}$ is lower than $V_{dn2}$, configured to decide the first bank as the optimum bank when $V_{up1}$ is lower than $V_{dn1}$ and $V_{up2}$ is higher than $V_{dn2}$, and configured to decide the second bank as the optimum bank when $V_{up1}$ is lower than $V_{dn1}$ and $V_{up2}$ is lower than $V_{dn2}$, to output the bank selection signal for selecting the optimum bank between the first bank and the second bank.

* * * * *